(12) United States Patent
Omeragic et al.

(10) Patent No.: US 7,536,261 B2
(45) Date of Patent: May 19, 2009

(54) ANTI-SYMMETRIZED ELECTROMAGNETIC MEASUREMENTS

(75) Inventors: Dzevat Omeragic, Lexington, MA (US); Gerald N. Minerbo, Missouri City, TX (US); Richard A. Rosthal, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 238 days.

(21) Appl. No.: 11/279,739

(22) Filed: Apr. 13, 2006

(65) Prior Publication Data

US 2006/0253255 A1   Nov. 9, 2006

Related U.S. Application Data

(60) Provisional application No. 60/673,936, filed on Apr. 22, 2005.

(51) Int. Cl.
*G01V 3/10* (2006.01)

(52) U.S. Cl. .............. 702/6; 702/7; 702/9; 702/11; 324/338; 324/339; 324/343

(58) Field of Classification Search .............. 702/6, 702/7, 9, 11; 324/338, 339, 343, 333, 340, 324/341, 342, 346; 340/856.4
See application file for complete search history.

(56) References Cited

U.S. PATENT DOCUMENTS

| | | | |
|---|---|---|---|
| 5,508,616 A | 4/1996 | Sato et al. | |
| 6,044,325 A | 3/2000 | Chakravarthy et al. | |
| 6,163,155 A | 12/2000 | Bittar | |
| 6,297,639 B1 | 10/2001 | Clark et al. | |
| 6,393,364 B1 | 5/2002 | Gao et al. | |
| 6,553,314 B2 | 4/2003 | Kriegshauser et al. | |
| 6,556,015 B1 | 4/2003 | Omeragic et al. | |
| 6,556,016 B2 | 4/2003 | Gao et al. | |
| 6,584,408 B2 | 6/2003 | Omeragic | |
| 6,969,994 B2 * | 11/2005 | Minerbo et al. | 324/343 |
| 6,998,844 B2 | 2/2006 | Omeragic et al. | |
| 7,382,135 B2 * | 6/2008 | Li et al. | 324/338 |
| 2003/0085707 A1 * | 5/2003 | Minerbo et al. | 324/343 |
| 2005/0083063 A1 | 4/2005 | Omeragic et al. | |
| 2005/0140373 A1 * | 6/2005 | Li et al. | 324/338 |

FOREIGN PATENT DOCUMENTS

| | | | |
|---|---|---|---|
| GB | 2354077 A * | 3/2001 |
| GB | 2396018 A * | 6/2004 |
| GB | 2425357 A * | 10/2006 |

(Continued)

OTHER PUBLICATIONS

Luling et al., "Processing and Modeling 2 MHz Resistivity Tools in Dipping, Laminated, Anisotropic Formations," SPWLA 35th Annual Logging Symposium (1994).

(Continued)

*Primary Examiner*—Carol S Tsai
(74) *Attorney, Agent, or Firm*—Darla Fonseco; Brigitte Echols; Dale Gaudier

(57) ABSTRACT

A method to determine a parameter of a subsurface formation such as anisotropy and dip comprises making at least two cross dipole measurements and forming an anti-symmetrized combination from the at least two cross dipole measurements.

13 Claims, 10 Drawing Sheets

FOREIGN PATENT DOCUMENTS

| RU | 960701 | 4/1981 |
|---|---|---|
| RU | 998995 | 2/1983 |
| RU | 2069878 | 11/1996 |
| RU | 2107313 | 3/1998 |

OTHER PUBLICATIONS

Moran et al., "Effect of Formation Anisotropy on Resisitivity Logging Measurements," Geophysics v. 44, No. 7, pp. 1266-1286 (Jul. 1979).

Spies et al., "Sensitivity Analysis of Cross well Electromagnetics," Geophysics v 60, No. 3, pp. 834-845 (May-Jun. 1995).

VF Machetin, et al., "TEMP-a New Dual-Electromagnetic and Laterolog Apparatus-Technological Complex," 13th European Formation Evaluation Symposium Transactions, Budapest Chapter, SPWLA, Paper K (1990).

VA Korolev et al., "Electromagnetic Logging by a Lateral Magnetic Dipole, Perspectives of Electromagnetic Well Scanning," Geofizika Scientific-Production Company, Russia (1995).

"Double Electromagnetic and Lateral Logging," Methodical Handbook, Moscow, Nedra, Russian (1991).

* cited by examiner

FIG.3A
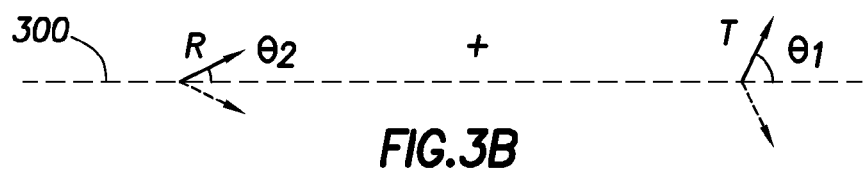
FIG.3B
FIG.4A
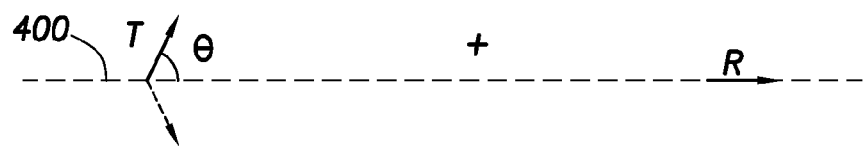
FIG.4B
FIG.5
| FIG.6A | FIG.6C | FIG.6E |
|---|---|---|
| FIG.6B | FIG.6D | FIG.6F |
FIG.6

| FIG.8A | FIG.8C |
| --- | --- |
| FIG.8B | FIG.8D |
FIG.8
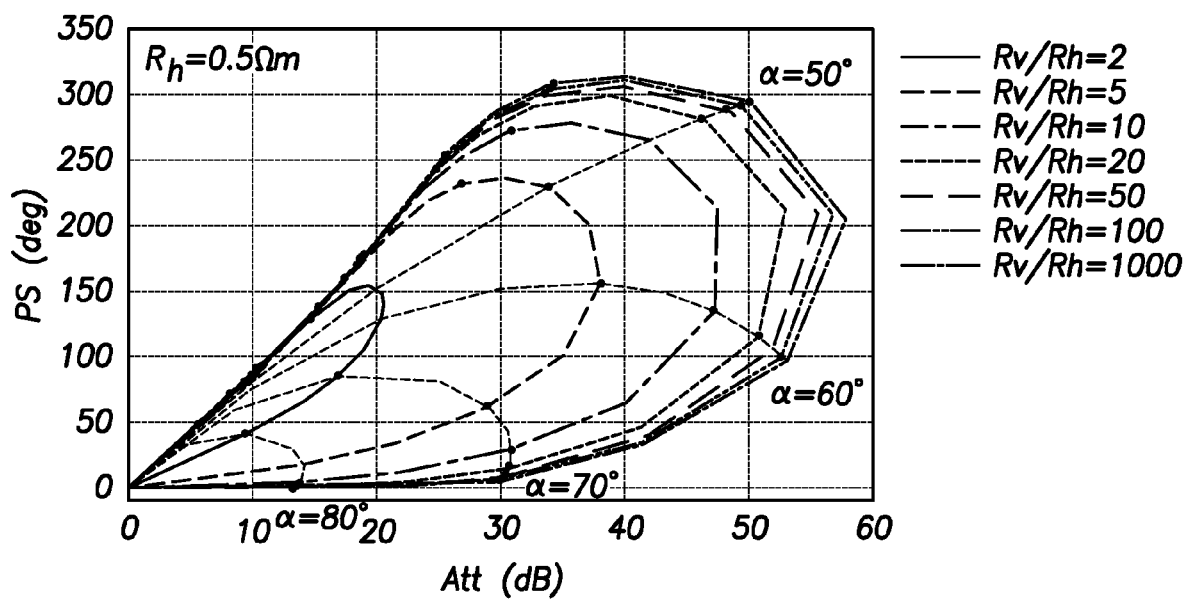
FIG.8A
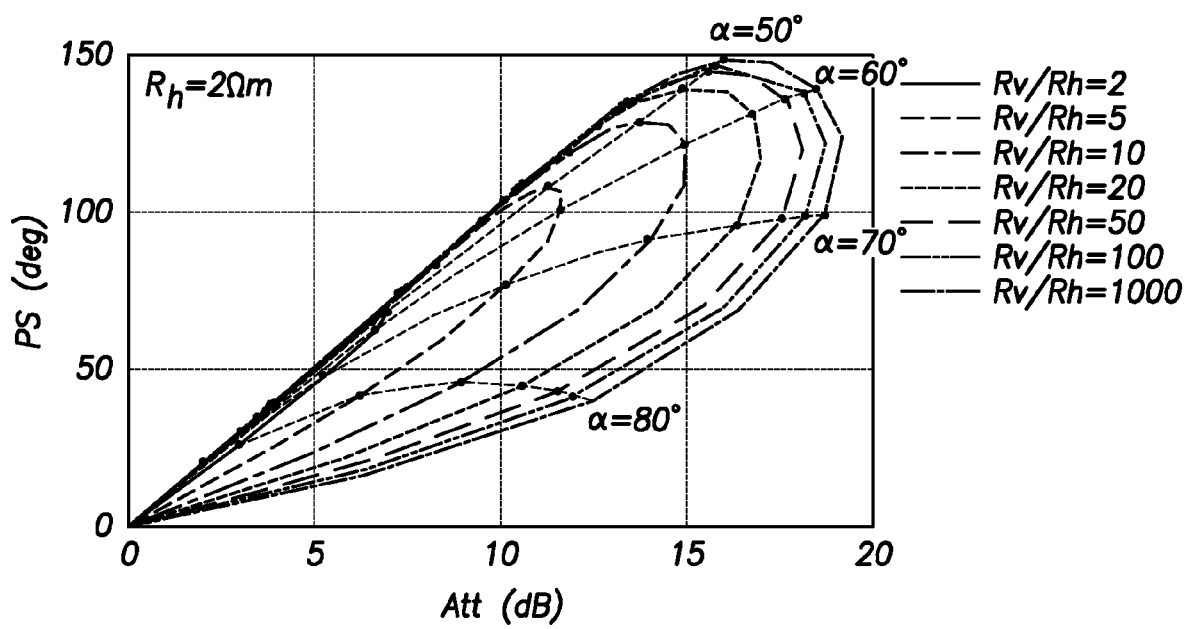
FIG.8B

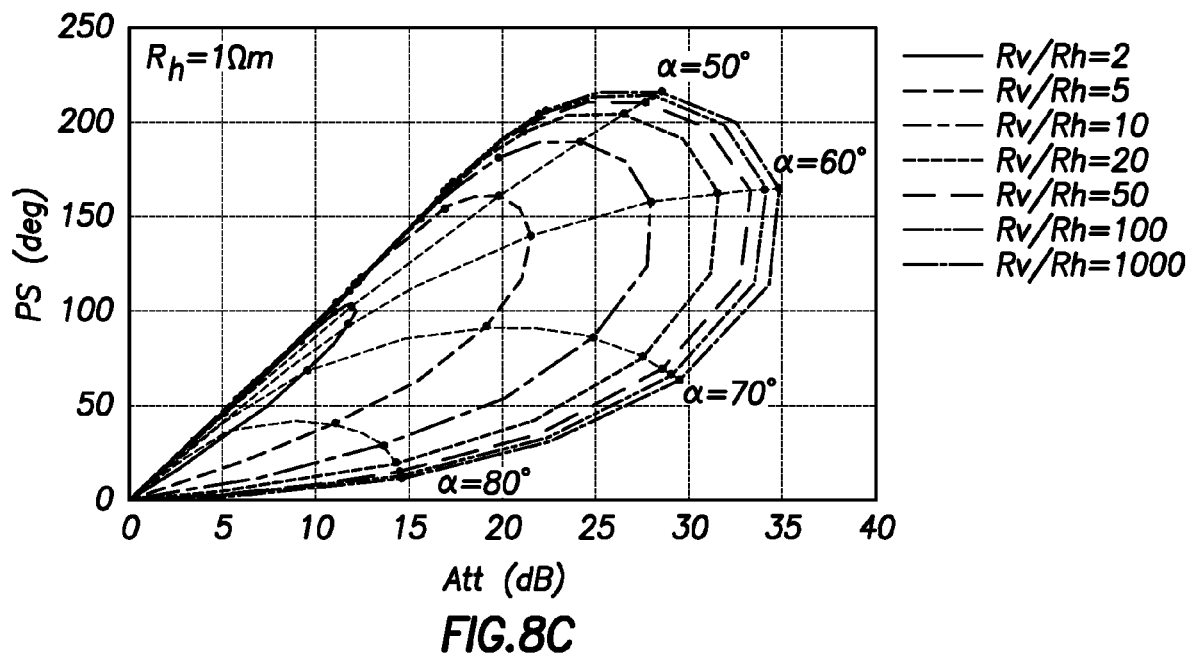
FIG.8C
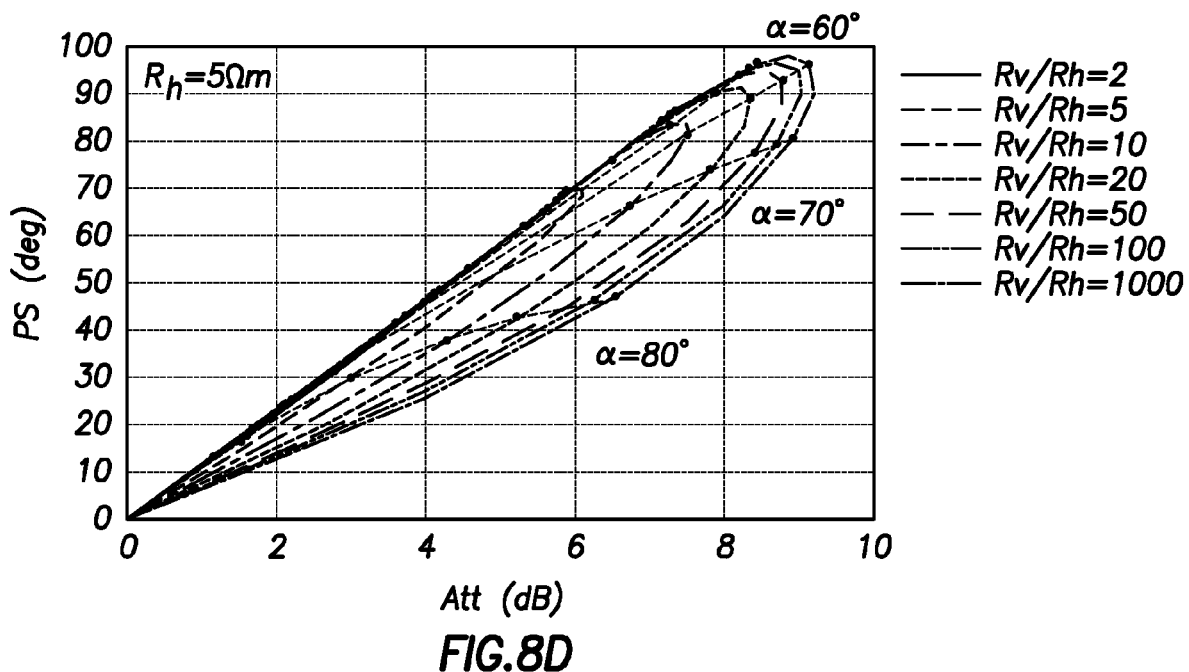
FIG.8D
| FIG.9A |
|---|
| FIG.9B |
FIG.9
| FIG.10A |
|---|
| FIG.10B |
FIG.10

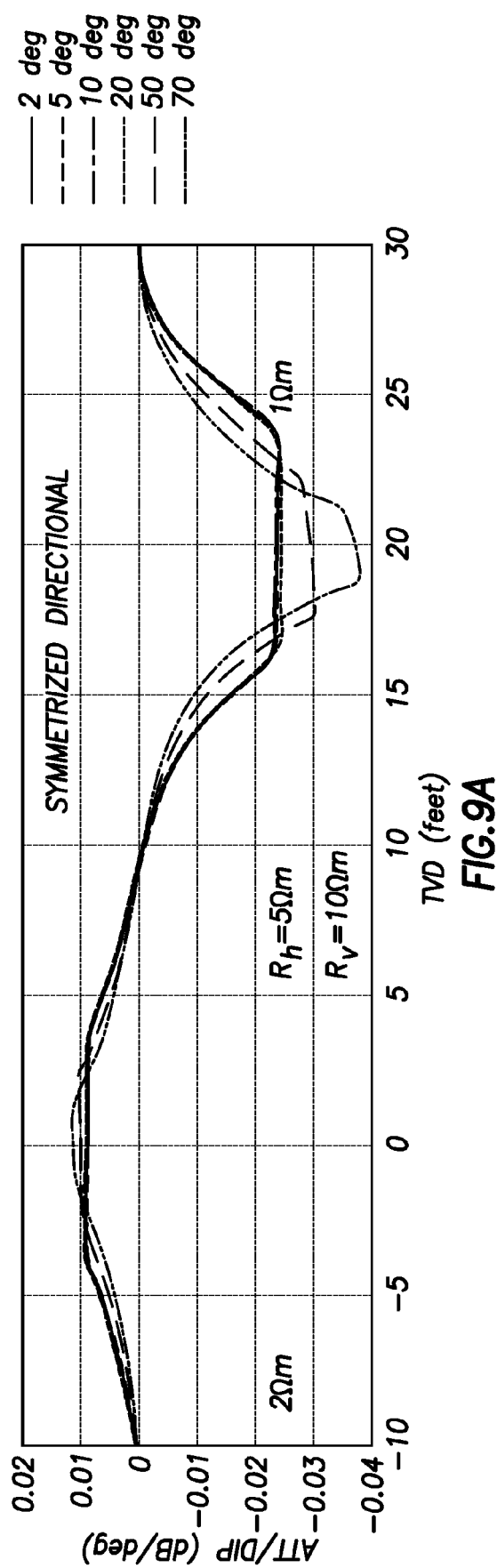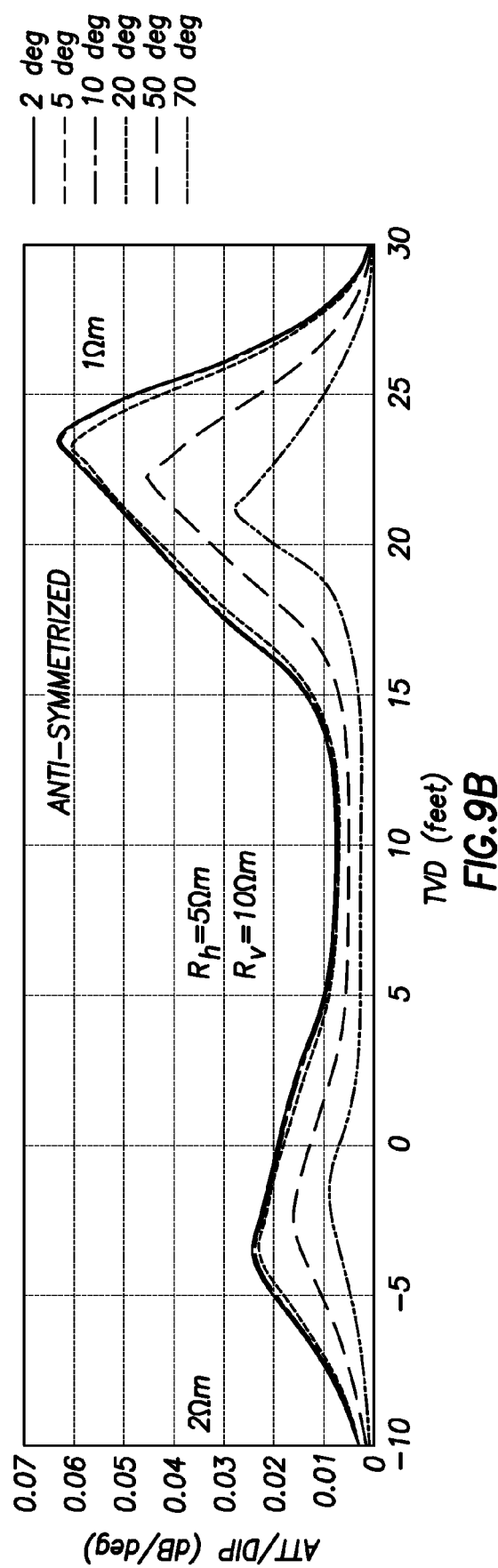

ANTI-SYMMETRIZED ELECTROMAGNETIC MEASUREMENTS

CROSS-REFERENCE TO RELATED APPLICATIONS

This application claims benefit of U.S. provisional patent application Ser. No. 60/673,936, filed Apr. 22, 2005, which is herein incorporated by reference.

BACKGROUND

1. Field of the Invention

Implementations of various technologies described herein generally relate to the field of well logging, and more particularly, to techniques in which tools equipped with antenna systems having transverse or tilted magnetic dipoles may be used for improved electromagnetic measurements of subsurface formations.

2. Description of the Related Art

The following descriptions and examples are not admitted to be prior art by virtue of their inclusion within this section.

Various well logging techniques are known in the field of hydrocarbon exploration and production. These techniques typically use tools or tools equipped with sources adapted to emit energy into a subsurface formation that has been penetrated by a borehole. The emitted energy may interact with the surrounding formation to produce signals that may then be detected and measured by one or more sensors. By processing the detected signal data, a profile of the formation properties may be obtained.

Examples of well logging tools may include electromagnetic (EM) resistivity tools, such as induction and propagation tools. The EM resistivity tools may be disposed within a borehole to measure the electrical conductivity (or its inverse resistivity) of earth formations surrounding the borehole. A typical electromagnetic resistivity tool includes a transmitter antenna and one or more (typically a pair) receiver antennas disposed at a distance from the transmitter antenna along the axis of the tool.

EM induction tools measure the resistivity (or conductivity) of the formation by measuring the voltage induced in the receiver antenna as a result of magnetic flux induced by currents flowing through the formation in response to an EM signal from the emitting (or transmitter) antenna. EM propagation tools operate in a similar fashion but typically at higher frequencies than do EM induction tools for comparable antenna spacings. Propagation tools typically operate at a frequency range of 1 kHz-2 MHz, but may also operate in the gigahertz range, as in dielectric logging tools.

Conventional transmitters and receivers are antennas formed of coils having one or more turns of insulated conductor wire wound around a support. These antennas are typically operable as transmitters and/or receivers.

A coil carrying a current (e.g., a transmitter coil) is configured to generate a magnetic field. The electromagnetic energy from the transmitter antenna may be transmitted into the surrounding formation, which induces a current (eddy current) flowing in the formation around the transmitter. The eddy current in the formation in turn may generate a magnetic field that induces an electrical voltage in the receiver antennas. If a pair of spaced-apart receivers is used, the induced voltages in the two receiver antennas would have different phases and amplitudes due to geometric spreading and absorption by the surrounding formation. For conventional induction tools, the coils are wound in opposition and connected together in series. The number of turns and the location of the coils are adjusted so that the combined voltage is nearly zero in air. Older induction tool designs often had more than one transmitter and more than two receivers. For propagation tools, the phase shift, $\phi$, and attenuation, A, between the coils may be measured. The phase shift and the attenuation from the two receivers may be used to derive electrical properties of the formation. The detected phase shift ($\phi$) and attenuation (A) may depend not only on the spacing between the two receivers and the spacing between the transmitter and the receivers, but also on the frequency of EM waves generated by the transmitter.

In conventional EM induction and propagation logging tools, the transmitter and receiver antennas are mounted with their axes along the longitudinal axis of the tool. Thus, these tools are implemented with antennas having longitudinal magnetic dipoles (LMD). An emerging technique in the field of well logging is the use of tools including antennas having tilted or transverse coils, i.e., where the coil's axis is not parallel to the longitudinal axis of the support or borehole. These antennas generate a transverse or tilted magnetic dipole (TMD) moment.

Electromagnetic measurements made by tools such as propagation and induction tools may contain information regarding electromagnetic properties of the media through which the signal passes. Information such as distance to bed boundaries, formation dip, and anisotropy may be extracted from the received signals.

SUMMARY

A method to determine a parameter of a subsurface formation such as anisotropy and dip comprises making at least two cross dipole measurements and forming an anti-symmetrized combination from the at least two cross dipole measurements.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIGS. 3A and 3B illustrate a schematic diagram of an anti-symmetrized directional propagation measurement according to implementations of various technologies described herein.

FIGS. 4A and 4B illustrate a schematic diagram of an anti-symmetrized directional propagation measurement according to implementations of various technologies described herein.

FIG. 5 illustrates a schematic diagram of an anti-symmetrized directional propagation measurement according to implementations of various technologies described herein.

FIG. 8 illustrates parametric plots for 84" 400 kHz axial-tilted anti-symmetrized measurement, for fixed horizontal resistivities of 0.5 Ωm, 1 Ωm, 2 Ωm and 5 Ωm in accordance with one implementation of various technologies described herein.

FIG. 9 illustrates a normalized symmetrized and anti-symmetrized 84" 100 kHz attenuation response of axial-tilted directional measurements in a 20 ft bed, $R_h$=5 Ωm, $R_v$=10 Ωm, with shoulder beds of 2 Ωm and 1 Ωm in accordance with one implementation of various technologies described herein.

DETAILED DESCRIPTION

Figure 1:
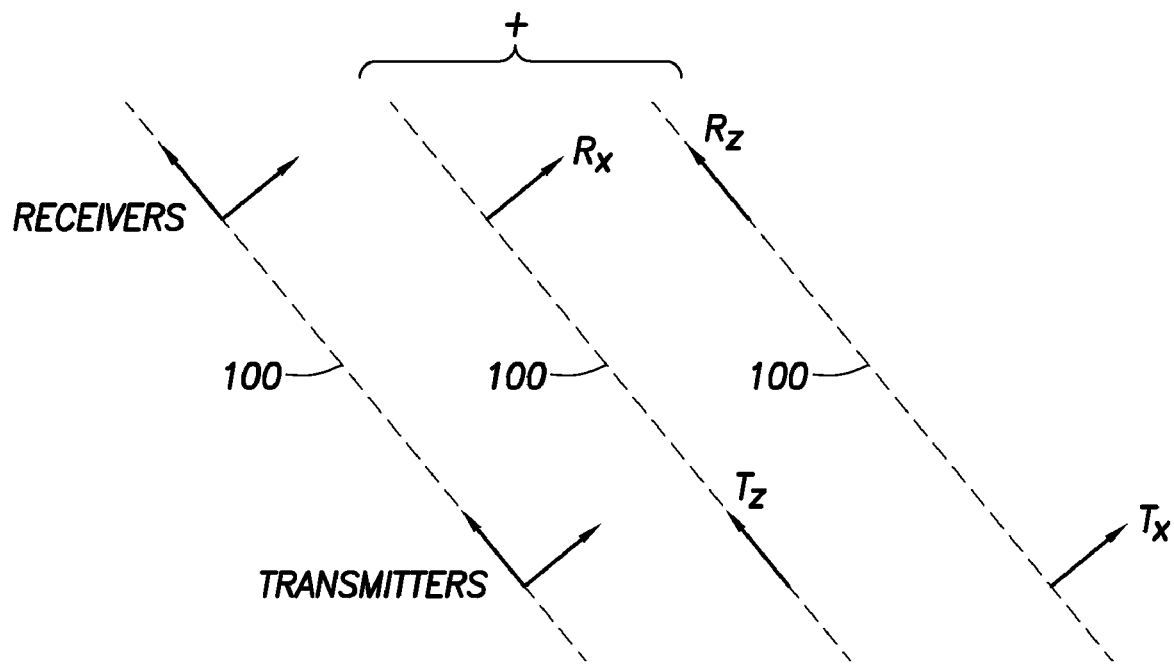
FIG. 1 illustrates a schematic diagram of a symmetrized cross-dipole directional measurement according to implementations of various technologies described herein.

As used herein, the terms "up" and "down", "upper" and "lower", "upwardly" and "downwardly", "below" and "above", and other similar terms indicating relative positions above or below a given point or element may be used in connection with some implementations of various technologies described herein. However, when applied to equipment and methods for use in wells that are deviated or horizontal, or when applied to equipment and methods that when arranged in a well are in a deviated or horizontal orientation, such terms may refer to a left to right, right to left, or other relationships as appropriate. When applied to logging-while-drilling measurements, employing transverse or triaxial coils on a rotating tool in a deviated or horizontal well, "up" and "down" may refer to upward or downward orientation of the tool as it is rotated about its axis.

As used herein, the term "tool" may be used interchangeably to indicate, for example, an electromagnetic tool, a wireline tool, or a logging-while-drilling tool. Although implementations of various technologies described herein are with reference to an induction tool and a propagation tool, it should be understood that some implementations may be used in other operations, such as logging-while-tripping, permanent monitoring, dielectric constant logging, and the like. Further, as used herein, any reference to conductivity may be intended to encompass its inverse, resistivity, or vice versa.

Implementations of various technologies described herein propose anti-symmetrized directional measurements for determining anisotropy in non-horizontal and non-vertical wells. In one implementation, use of these measurements may allow determination of anisotropy and dip effect for dip above 35°.

The following equations provide the mathematical theory underlying the various implementations described herein. The transmitter coil has a magnetic moment described by the vector M. The magnetic field at the receiver coil is denoted by the vector H. In a tool coordinate system, starting with formulations described by Moran and Gianzero ("Effect of formation anisotropy on resistivity-logging measurements", Geophysics, V. 44, No. 7, July 1979, pp. 1266-1286), after the dip-azimuth rotation (dip angle α, strike angle β), the magnetic field and magnetic dipole sources may be related as:

$$H = T' \cdot M, \begin{bmatrix} H_{xl} \\ H_{yl} \\ H_{zl} \end{bmatrix} = T' \cdot \begin{bmatrix} M_{xl} \\ M_{yl} \\ M_{zl} \end{bmatrix}, \quad \text{Equation (1)}$$

where, in the formation coordinates, T, for an infinite, homogeneous medium with transverse isotropic (TI) anisotropy may be expressed as:

$$T = \begin{bmatrix} T_h & 0 & 0 \\ 0 & T_h & 0 \\ 0 & 0 & L_h \end{bmatrix} + \frac{1}{4\pi}\left(\frac{k_v k_h}{s}e^{ik_v s} - \frac{k_h^2}{r}e^{ik_h r}\right) \cdot \begin{bmatrix} 0 & 0 & 0 \\ 0 & 1 & 0 \\ 0 & 0 & 0 \end{bmatrix} +$$

$$\frac{ik_h}{4\pi r^2 \sin^2\alpha}(e^{ik_h r} - e^{ik_v s}) \cdot \begin{bmatrix} \cos^2\alpha & 0 & -\sin\alpha\cos\alpha \\ 0 & -1 & 0 \\ -\sin\alpha\cos\alpha & 0 & \sin^2\alpha \end{bmatrix}.$$

Equation (2)

Distances p and s and coordinates x, y and z may be written in terms of transmitter-receiver spacing r and relative dip angle α, as follows:

$$p^2 = r^2\sin^2\alpha \quad \text{Equation (3)}$$
$$z = r\cos\alpha$$
$$s = r\sqrt{\sin^2\alpha + \lambda^2\cos^2\alpha}$$
$$x = -r\sin\alpha$$
$$y = 0.$$

$L_h$ and $T_h$ are elementary functions, corresponding to the coupling of longitudinal and transverse coil pairs separated by distance r in homogeneous isotropic medium of horizontal conductivity $\sigma_h$ and vertical conductivity $\sigma_v$ which may be expressed as follows:

$$T_h = \frac{e^{ik_h r}}{4\pi r^3}(-1 + ik_h r + k_h^2 r^2) \quad \text{Equation (4)}$$

$$L_h = \frac{e^{ik_h r}}{2\pi r^3}(1 - ik_h r).$$

The XZ coupling may be expressed as:

$$T_{xz} = T_{zx} = \frac{ik_h}{4\pi r^2}(e^{ik_v r} - e^{ik_h s})\cot\alpha. \quad \text{Equation (5)}$$

From equations (1) to (5), it may be deduced that conventional (ZZ) measurement is insensitive to separating relative dip angle from anisotropy. Rather, conventional (ZZ) measurement is sensitive to parameter $k_v s$ that couples relative dip angle with anisotropy. The anisotropy coefficient $\lambda^2$ may be defined as a ratio of the horizontal conductivity $\sigma_h$, divided by the vertical conductivity $\sigma_v$: $\lambda^2 = \sigma_h/\sigma_v$. The relative dip angle may be defined as the angle between the borehole axis (or the tool axis) and the normal to the plane of the formation.

In contrast, the cross-dipole measurements (ZX and XZ) are sensitive to anisotropy and relative dip angle. The term "cross dipole", as used herein, means a cross term or off-diagonal term of a matrix. The separation between the relative dip angle and anisotropy at low angles may be expressed as:

$$\lim_{\alpha \to 0} \left( \frac{ik_h}{r^2 \sin^2 \alpha} (e^{ik_h r} - e^{ik_v s}) \right) = \frac{k_v^2 - k_h^2}{2r} e^{ik_h r}. \quad \text{Equation (6)}$$

Thus, the XZ and ZX couplings are proportional to $(k_v^2 - k_h^2) \sin(\alpha)$ for small angles $\alpha$.

Forming symmetrized combinations using cross dipole measurements (e.g., subtraction of cross dipole measurements to remove or nearly remove the anisotropy and dip effect, and to enhance bed boundaries) is taught in U.S. Pat. No. 6,969,994, incorporated herein by reference. Here we have shown that forming anti-symmetrized combinations of cross dipole measurements will amplify the sensitivity to anisotropy and dip, and reduce the sensitivity to bed boundaries.

Different tools may require different combinations of anti-symmetrized measurements. For example, a propagation tool may use a ratio of measurements, while an induction tool may use a sum of the measurements. Also, a rotating tool, whether a propagation tool or an induction tool, may use some combination of "up/down" measurements (see below).

In one implementation, a cross-dipole measurement performed by an induction tool may be represented as $M(\theta_1, \theta_2) + M^*(\theta_2, \theta_1)$ or $M(\theta_1, \theta_2) - M^*(\theta_2, 180°-\theta_1)$, where $M(\theta_1, \theta_2)$ is the induction measurement with tilted antenna(s), $\theta_1$ is the transmitter tilt angle and $\theta_2$ is the tilt angle of the receiver antenna, and $M^*(\theta_2, \theta_1)$ is the measurement with the transmitter and receiver interchanged (i.e., $M^*$ is the mirror image of M with respect to the central plane perpendicular to the tool axis, with all antenna orientations preserved).

In another implementation, a cross-dipole measurement performed by a propagation tool may be represented as: $(M(\theta_1, \theta_2) + M^*(\theta_1, \theta_2))_{UP/DOWN}$ or $(M(\theta_1, \theta_2) - M^*(\theta_1, 180°-\theta_2))_{UP/DOWN}$, where $M(\theta_1, \theta_2)_{UP/DOWN}$ is the ratio of the propagation measurement made with tilted antenna(s) when the tool is first oriented up, then down, and $M^*$ is a similar ratio with the transmitters and receivers interchanged. (i.e., $M^*$ is the mirror image of M with respect to the central plane perpendicular to the tool axis, with all antenna orientations preserved). $\theta_1$ is the transmitter tilt angle and $\theta_2$ is tilt angle of the receiver antennas.

FIG. 1 illustrates a schematic diagram of an anti-symmetrized cross-dipole directional measurement according to implementations of various technologies described herein. The transmitters and receivers are approximated as point magnetic dipoles. Antennas labeled Z have a dipole moment along the tool axis 100, while antennas labeled X have a dipole moment perpendicular to the tool axis 100. In the interest of clarity, the tool axis is represented as a dashed line. In operation, first, the axially oriented transmitter $T_z$ is activated, and the voltage $V_{xz}$ on the transversely oriented receiver $R_x$ is measured. The transversely oriented transmitter $T_x$ is then activated and the voltage $V_{zx}$ on the axially oriented receiver $R_z$ is measured. The voltage $V_{xz}$ may be added to the voltage $V_{zx}$ to generate $V_{xz}+V_{zx}$, which may be sensitive to anisotropy and relative dip angle.

Figure 2:
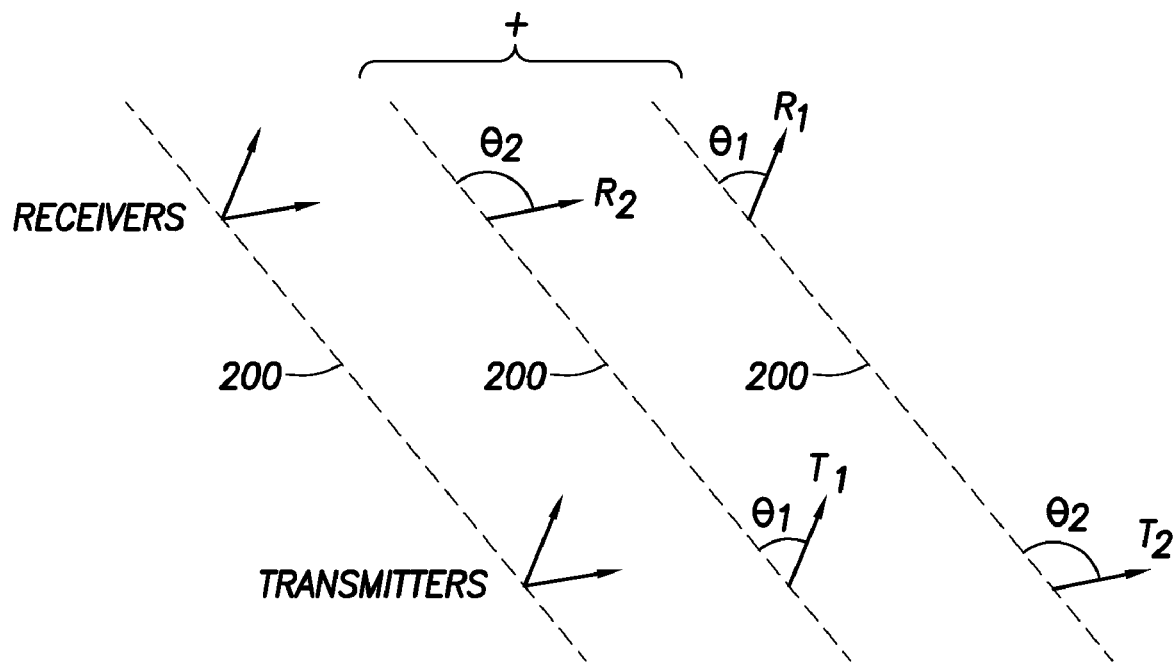
FIG. 2 illustrates a schematic diagram of a symmetrized directional induction measurement according to implementations of various technologies described herein.
Figure 6A:
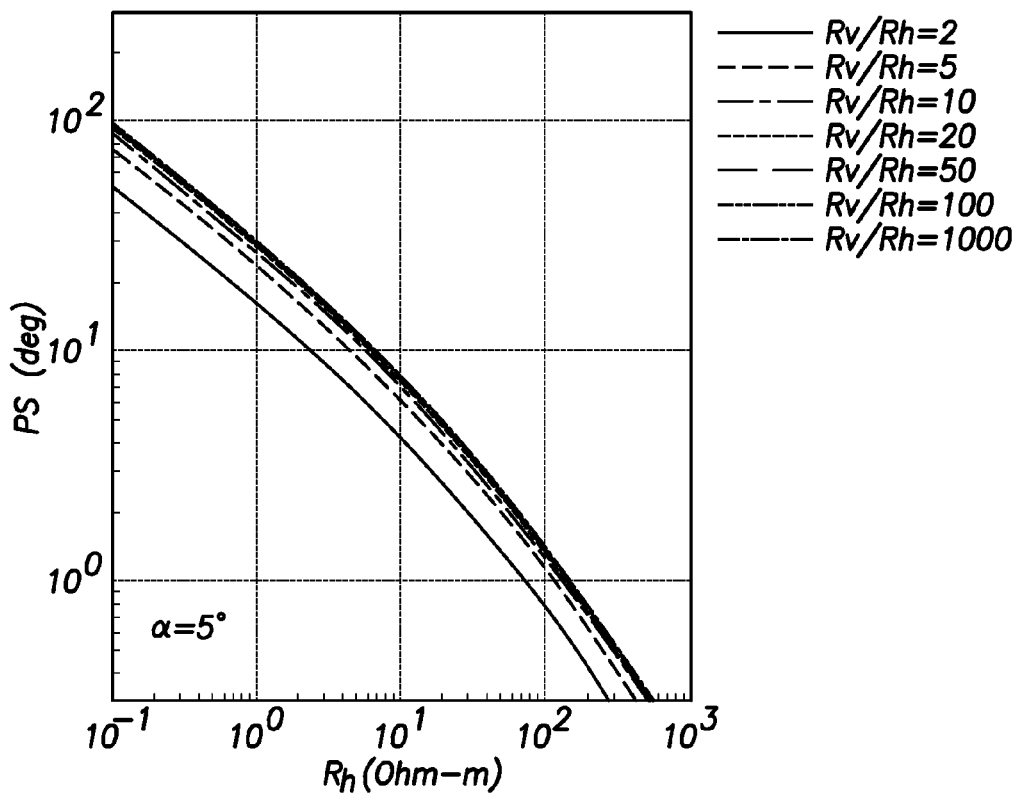
FIGS. 6A-6F illustrate the sensitivity of axial-tilted anti-symmetrized 84" 400 kHz phase shift to anisotropy for varied relative dip angle and horizontal resistivity in accordance with one implementation of various technologies described herein.
Figure 6B:
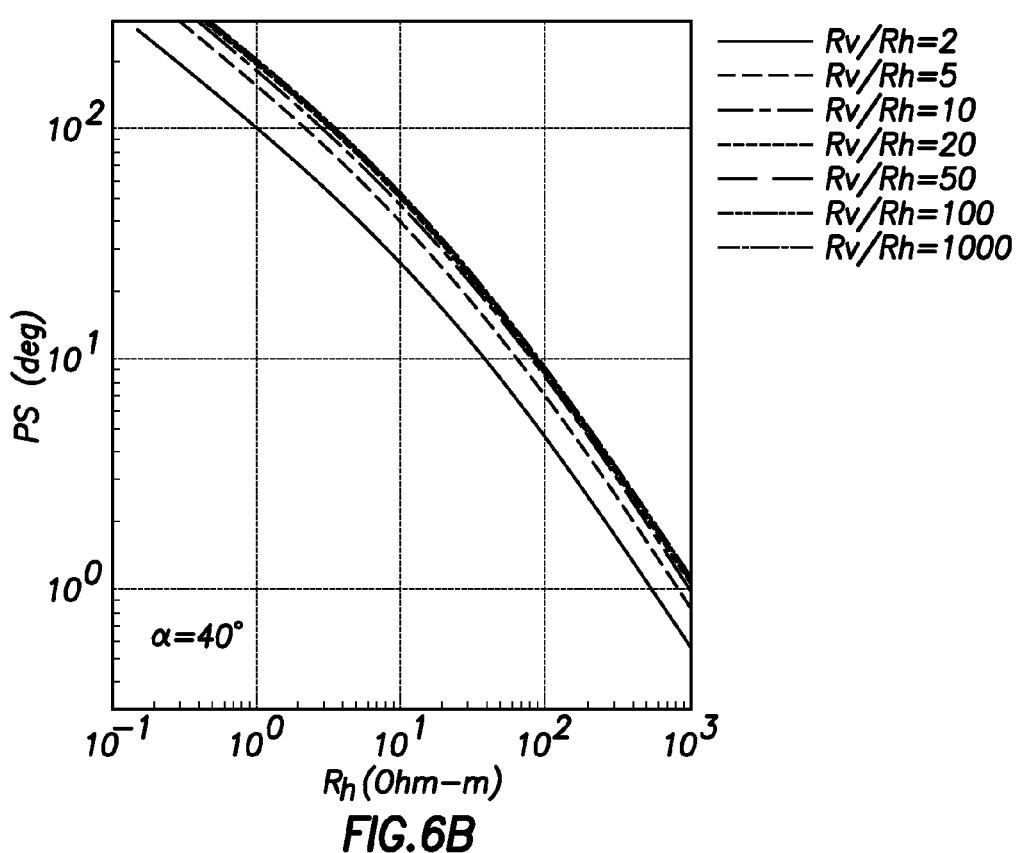
Figure 6C:
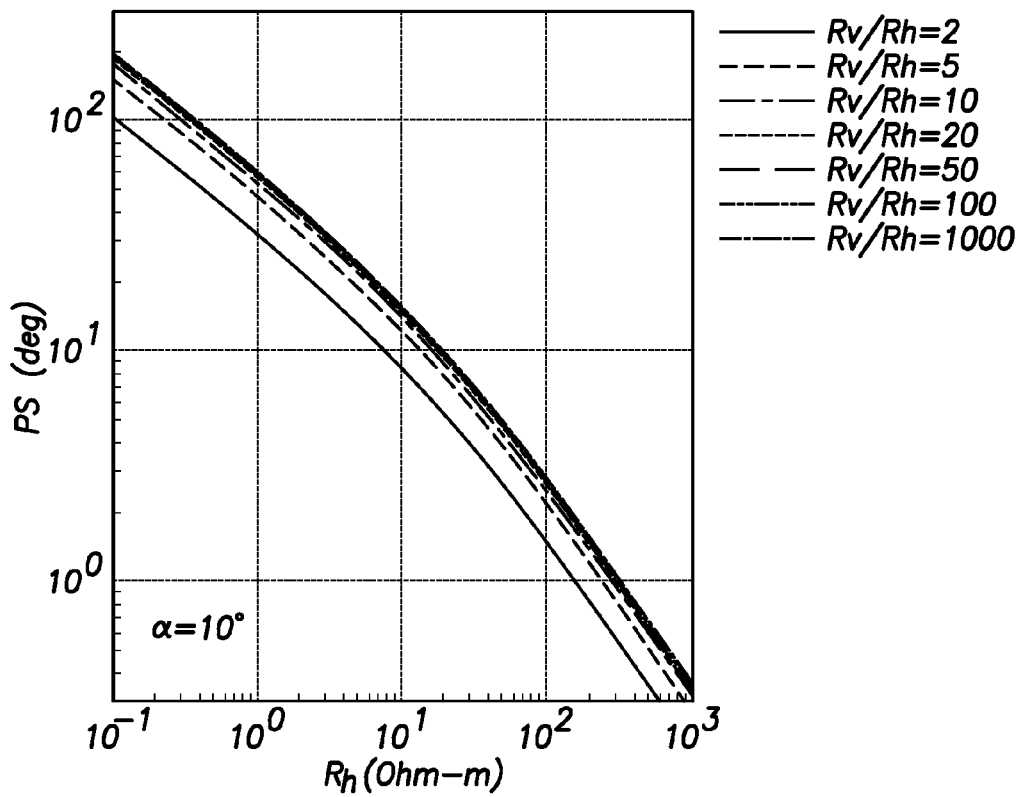
Figure 6D:
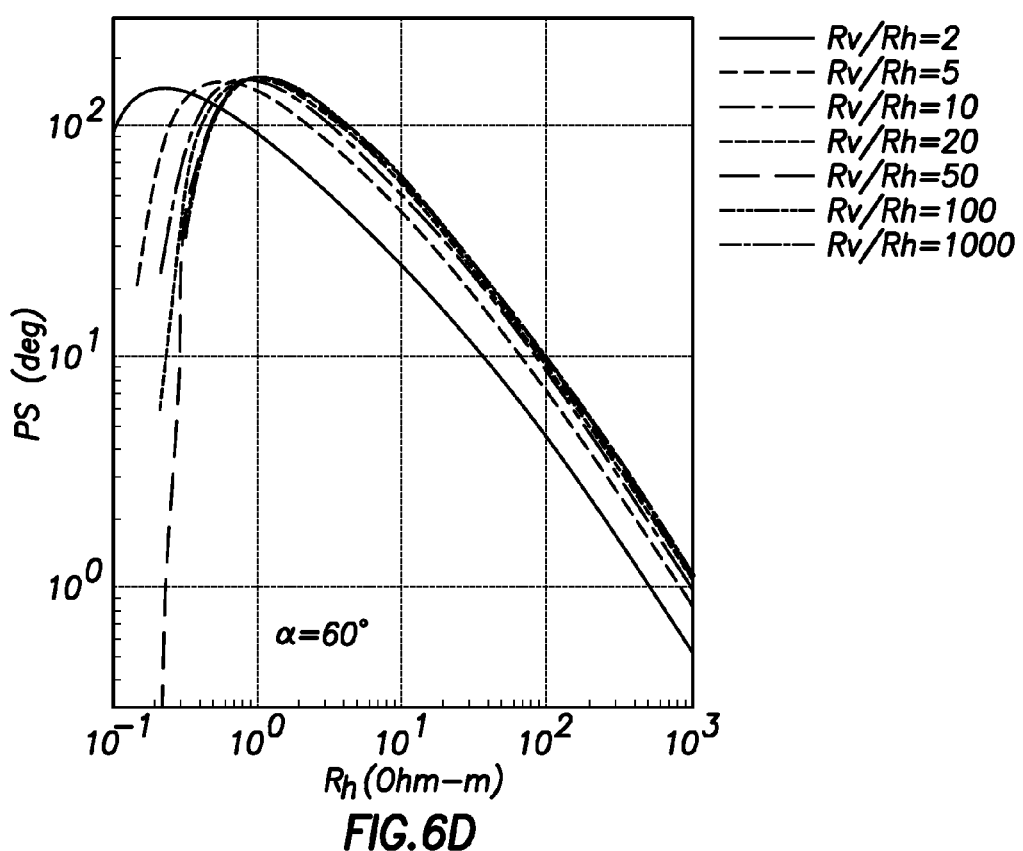
Figure 6E:
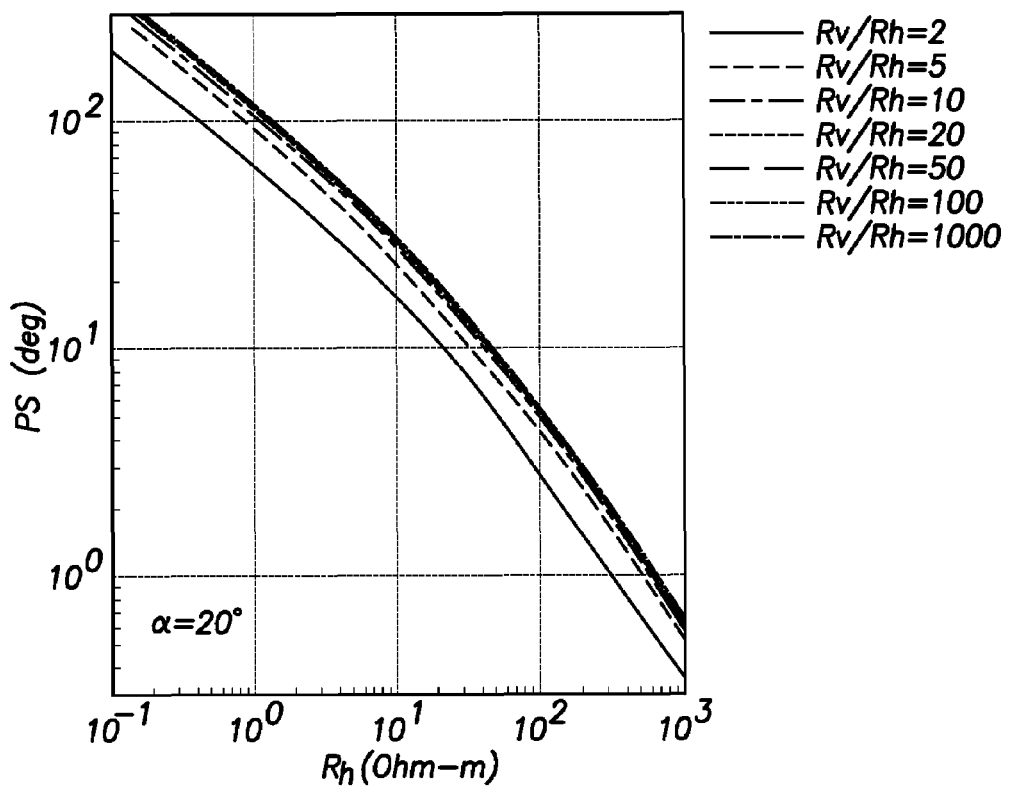
Figure 6F:
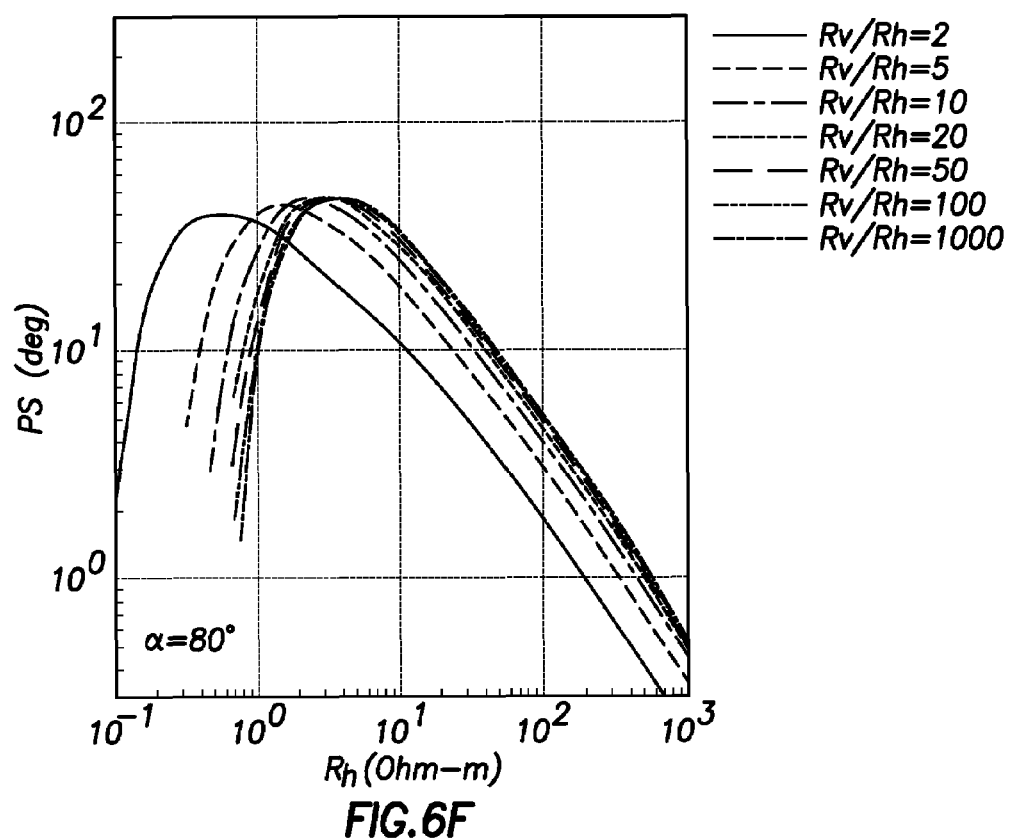

FIG. 2 illustrates a schematic diagram of a symmetrized directional induction measurement according to implementations of various technologies described herein. In one implementation, the anti-symmetrized directional induction measurement may be performed by an induction tool positioned inside a formation layer. The induction tool may include antennas labeled 1 having a dipole moment tilted at an angle $\theta_1$ from the tool axis 200 and antennas labeled 2 having a dipole moment tilted at an angle $\theta_2$. In one implementation, angle $\theta_1$ may be less than 90 degrees while angle $\theta_2$ may be greater than 90 degrees. In another implementation, the dipole moments of both antennas 1 and 2 may be aligned on the same plane.

In operation, the transmitter $T_1$ having a dipole moment tilted at an angle $\theta_1$ from the tool axis 200 may be activated, and the voltage $V_{21}$ on the receiver $R_2$ having a dipole moment tilted at an angle $\theta_2$ from the tool axis 200 may be measured. The transmitter $T_2$ having a dipole moment tilted at an angle $\theta_2$ from the tool axis 200 may then be activated and the voltage $V_{12}$ on the receiver $R_1$ having an dipole moment tilted at an angle $\theta_1$ from the tool axis 200 may be measured. Voltage $V_{12}$ may then be added to voltage $V_{21}$ to obtain information about anisotropy and a relative dip angle. Although the anti-symmetrized directional induction measurement is described above as using two receiver antennas, $R_1$ and $R_2$, it should be understood that in some implementations each receiver antenna may be mutually balanced with a bucking coil.

It should be understood that one antenna may be used as a transmitter at one time and as a receiver at another. It will also be appreciated that the transmitter-receiver configurations disclosed herein may be interchangeable due to the principle of reciprocity, i.e., the "transmitter" may be used as a "receiver", and vice-versa. For example, the positions of transmitter $T_1$ and receiver $R_1$ may be interchanged and the positions of transmitter $T_2$ and receiver $R_2$ may be interchanged. Further, it should be understood that various measurement implementations described herein may be performed at any frequency, for example, from the 1 kHz range to the GHz range.

FIGS. 3A and 3B illustrate a schematic diagram of an anti-symmetrized directional propagation measurement according to implementations of various technologies described herein. In one implementation, the anti-symmetrized directional propagation measurement may be performed by a propagation tool positioned inside a formation layer. The propagation tool may include a transmitter T having a dipole moment tilted at an angle $\theta_1$ from the tool axis 300 and a receiver R having a dipole moment tilted at an angle $\theta_2$ from the tool axis 300, as shown in FIG. 3A. In one implementation, both angle $\theta_1$ and angle $\theta_2$ may be different from 90 degrees. In another implementation, the dipole moment of the transmitter T and the dipole moment of the receiver R may be aligned on the same plane.

In operation, the transmitter T may be activated and the voltage on the receiver R may be measured as $V_{up}$, since the voltage $V_{up}$ is measured (according to one convention) while the transmitter T is directed toward the upper boundary. The propagation tool may then be rotated 180 degrees about its longitudinal axis from its upward position. At the downward position, the dipole moments of the transmitter T and the receiver R are represented by dotted lines. The transmitter T may then be activated and the voltage on the receiver R may be measured as $V_{down}$, since the voltage $V_{down}$ is measured while the transmitter T is directed toward the lower boundary. The logarithmic function of the ratio between $V_{up}$ and $V_{down}$ may then be calculated to generate a first propagation measurement, which may be equivalent to conventional propagation measurements using two receivers. In one implementation, the logarithmic function of the ratio between $V_{up}$ and $V_{down}$ may be expressed as $$\ln\frac{V_{up}}{V_{down}} = Ae^{i\phi},$$

where the attenuation, Att, and phase shift, PS, are defined as Att(db)=20*A/ln(10) and PS(deg)=(180/pi)*φ.

Following the first propagation measurement, the positions of the transmitter T and the receiver R may be interchanged, as shown in FIG. 3B. The transmitter T may be activated and the voltage $V_{up}$ on the receiver R may be measured. The propagation tool may then be rotated 180 degrees about its longitudinal axis from its upward position. At the downward position, the dipole moments of the transmitter T and the receiver R are represented by dotted lines. The transmitter T may then be activated and the voltage $V_{down}$ on the receiver R may be measured. The logarithmic function of the ratio between $V_{up}$ and $V_{down}$ may then be calculated to generate a second propagation measurement. As mentioned above, the logarithmic function of the ratio between $V_{up}$ and $V_{down}$ may be expressed as $$\ln\frac{V_{up}}{V_{down}} = Ae^{i\phi},$$

where the attenuation and phase shift may be defined as Att(db)=20*A/ln(10) and PS(deg)=(180/pi)*φ. The first propagation measurement may then be added to the second propagation measurement to obtain information regarding anisotropy and relative dip angle for the formation layer.

FIGS. 4A and 4B illustrate a schematic diagram of an anti-symmetrized directional propagation measurement according to implementations of various technologies described herein. In one implementation, a propagation tool may include a transmitter T having an axially oriented dipole moment and a receiver R having a dipole moment tilted at an angle θ from the tool axis 400, as shown in FIG. 4A. In one implementation, the angle θ may be less than 90 degrees.

In operation, the transmitter T may be activated and the voltage on the receiver R may be measured as $V_{up}$, since the voltage $V_{up}$ is measured while the receiver R is directed toward the upper boundary. The propagation tool may then be rotated 180 degrees about its longitudinal axis. At this position, the dipole moment of the transmitter T remains the same since it is coincident with the tool axis 400; however, the dipole moment of the receiver R is represented by dotted lines. The transmitter T may then be activated and the voltage on the receiver R may be measured as $V_{down}$, since the voltage $V_{down}$ is measured while the receiver R is directed toward the lower boundary. The logarithmic function of the ratio between $V_{up}$ and $V_{down}$ may then be calculated to generate a first propagation measurement. In one implementation, the logarithmic function of the ratio between $V_{up}$ and $V_{down}$ may be expressed as ln $$\ln\frac{V_{up}}{V_{down}} = Ae^{i\phi},$$

where the attenuation and phase shift may be defined as Att(db)=20*A/ln(10) and PS(deg)=(180/pi)*φ.

Following the first propagation measurement, the transmitter T may be adjusted such that its dipole moment is tilted at an angle θ from the tool axis 400 and the receiver R may be adjusted such that its dipole moment is coincident with the tool axis 400, as shown in FIG. 4B. The transmitter T may be activated and the voltage $V_{up}$ on the receiver R may be measured. The propagation tool may then be rotated 180 degrees about its longitudinal axis from its upward position. At the downward position, the dipole moment of the transmitter T is represented by dotted lines while the dipole moment of the receiver R remains the same. The transmitter T may then be activated and the voltage $V_{down}$ on the receiver R may be measured. The logarithmic function of the ratio between $V_{up}$ and $V_{down}$ may then be calculated to generate a second propagation measurement. As mentioned above, the logarithmic function of the ratio between $V_{up}$ and $V_{down}$ may be expressed as ln $$\ln\frac{V_{up}}{V_{down}} = Ae^{i\phi},$$

where the attenuation and phase shift may be defined as Att(db)=20*A/ln(10) and PS(deg)=(180/pi)*φ. The first propagation measurement may then be added to the second propagation measurement to obtain information about anisotropy and relative dip angle for the formation layer.

FIG. 5 illustrates a schematic diagram of an anti-symmetrized directional propagation measurement according to implementations of various technologies described herein. In one implementation, a propagation tool may include a transmitter T having a dipole moment tilted at an angle θ from the tool axis 500 and a receiver R having a dipole moment tilted at the same angle θ from the tool axis 500. In one implementation, the angle θ may be less than 90 degrees. In another implementation, the dipole moment of the transmitter T and the dipole moment of the receiver R may be aligned on the same plane.

In operation, the transmitter T may be activated and the voltage on the receiver R may be measured as $V_{up}$, since the voltage $V_{up}$ is measured while the transmitter T is are directed toward the upper boundary. The propagation tool may then be rotated 180 degrees about its longitudinal axis from its upward position. At the downward position, the dipole moments of the transmitter T and the receiver R are represented by dotted lines. The transmitter T may then be activated and the voltage on the receiver R may be measured as $V_{down}$, since the voltage $V_{down}$ is measured while the transmitter T is directed toward the lower boundary. The logarithmic function of the ratio between $V_{up}$ and $V_{down}$ may then be calculated to obtain information regarding anisotropy and relative dip angle for the formation layer. In one implementation, the logarithmic function of the ratio between $V_{up}$ and $V_{down}$ may be expressed as $$\ln\frac{V_{up}}{V_{down}} = Ae^{i\phi},$$

where the attenuation and phase shift may be defined as Att(db)=20*A/ln(10) and PS(deg)=180/pi)*φ.

In this manner, implementations of various technologies described herein may be used to estimate the formation resistivity anisotropy at any angle, independent of mud type.

The following illustrate the performance of anti-symmetrized measurements in accordance with implementations of various technologies described herein. FIG. 6 illustrates the sensitivity of axial-tilted anti-symmetrized 84" 400 kHz phase shift to anisotropy for varied relative dip angle and horizontal resistivity in accordance with one implementation of various technologies described herein. FIG. 6 illustrates that even at 5° or 80°, there is a significant change in signal due to anisotropy. For example, at 5°, for $R_v/R_h=2$, at $R_h=1$ $\Omega m$, the anti-symmetrized reading is about 15°. Notably, at low angle, the signal is nearly proportional to the apparent dip.

Figure 7:
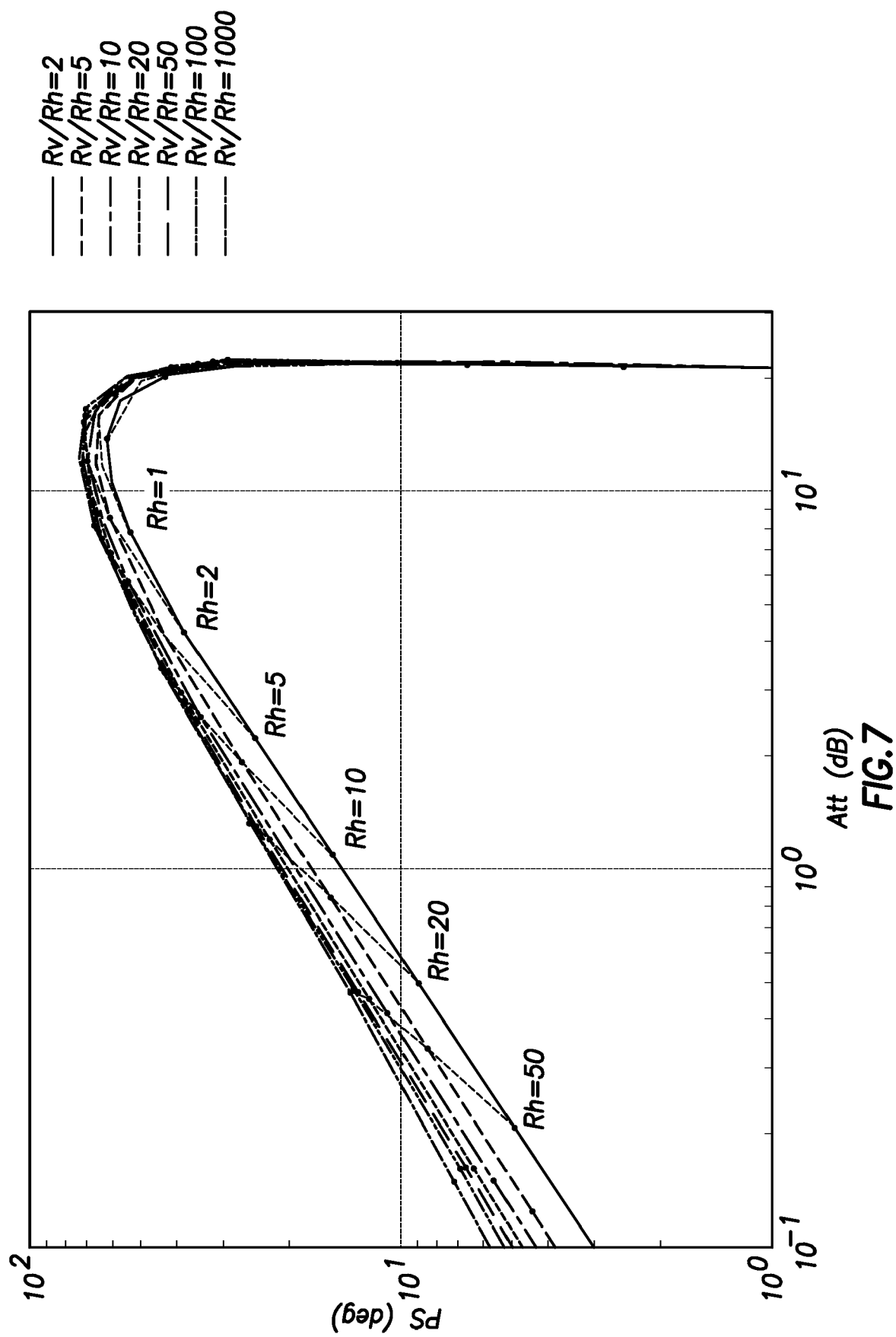
FIG. 7 illustrates a parametric plot for 84" 400 kHz axial-tilted anti-symmetrized measurement at a relative dip angle of 75° in accordance with one implementation of various technologies described herein.

FIG. 7 illustrates a parametric plot for 84" 400 kHz axial-tilted anti-symmetrized measurement at a relative dip angle of 75° in accordance with one implementation of various technologies described herein.

FIG. 8 illustrates parametric plots for 84" 400 kHz axial-tiled anti-symmetrized measurement, for fixed horizontal resistivities of 0.5 $\Omega m$, 1 $\Omega m$, 2 $\Omega m$ and 5 $\Omega m$ in accordance with one implementation of various techniques described herein The anti-symmetrized measurement exhibits enormous sensitivity to anisotropy and dip, at orders of magnitude higher than conventional resistivity measurements. The anti-symmetrized measurement is particularly useful for separating anisotropy from relative dip angle, particularly for relative dip angles about 35°. At lower relative dip angles, the anti-symmetrized measurement may be sensitive to the product of anisotropy and relative dip angle.

FIG. 9 illustrates a normalized symmetrized and anti-symmetrized 84" 100 kHz attenuation response of axial-tilted directional measurements where the bed boundaries are located at zero and 20 feet true vertical depth (TVD). $R_h=5$ $\Omega m$, $R_v=10$ $\Omega m$, with shoulder beds of 2 $\Omega m$ and 1 $\Omega m$ in accordance with one implementation of various technologies described herein. The anti-symmetrized case shows poor sensitivity to bed boundary detection, particularly when compared to the symmetrized case. When the electromagnetic (EM) tool is inside the bed, anti-symmetrized responses may scale linearly with relative dip angle.

Figure 10A:
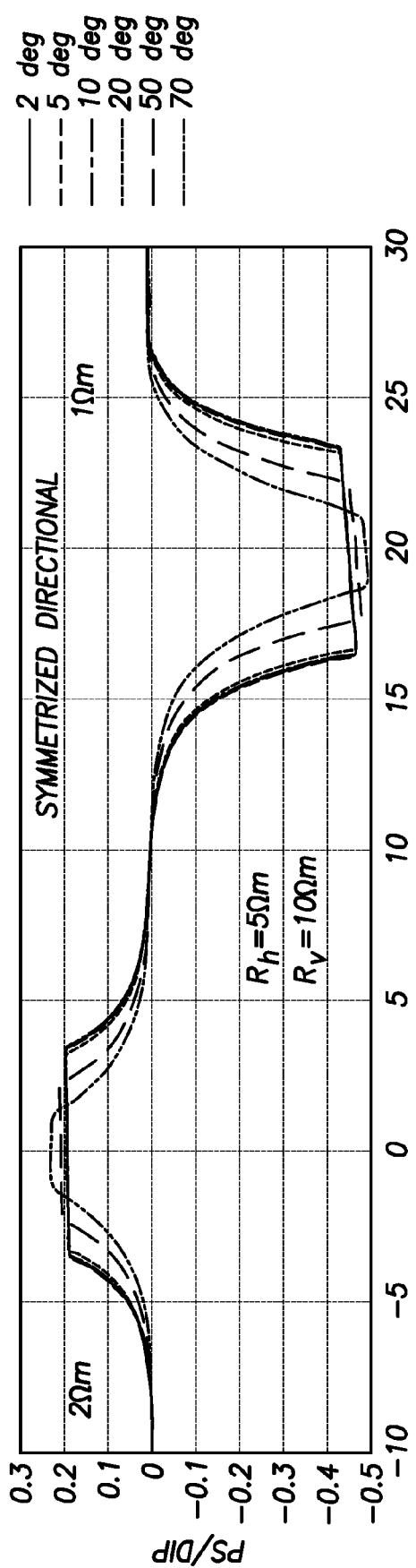
FIG. 10 illustrates a normalized symmetrized and anti-symmetrized 84" 100 kHz phase shift response of axial-tilted directional measurements in a 20 ft bed, $R_h$=5 Ωm, $R_v$=10 Ωm, with shoulder beds of 2 Ωm and 1 Ωm in accordance with one implementation of various technologies described herein.
Figure 10B:
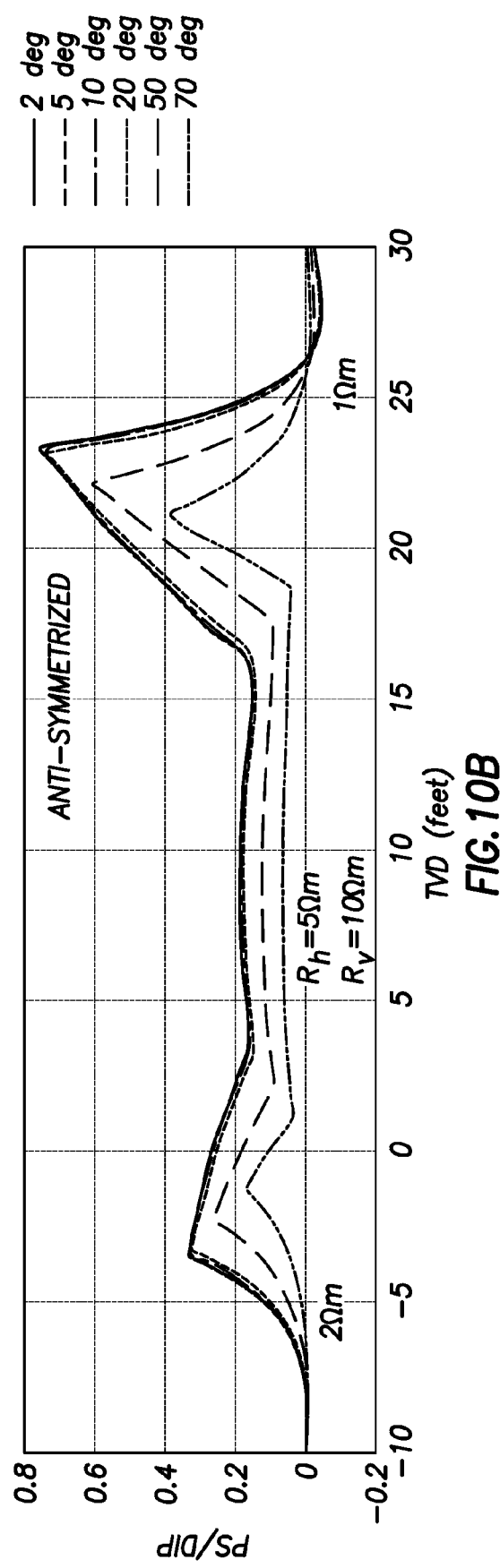

FIG. 10 illustrates a normalized symmetrized and anti-symmetrized 84" 100 kHz phase shift response of axial-tilted directional measurements in a 20 ft bed, $R_h=5$ $\Omega m$, $R_v=10$ $\Omega m$, with shoulder beds of 2 $\Omega m$ and 1 $\Omega m$ in accordance with one implementation of various technologies described herein. When the electromagnetic (EM) tool is inside the bed, anti-symmetrized responses may be insensitive to bed boundary and scale linearly with relative dip angle. When the electromagnetic (EM) tool is crossing the bed boundary, i.e., coils are on opposite side of the bed boundary, the symmetrized directional responses may be sensitive to boundary dip. Regardless, both symmetrized and anti-symmetrized measurement may scale linearly with relative dip angle. Symmetrized measurements may be proportional to relative dip angle when antennas are on opposite sides of the bed boundary. Anti-symmetrized measurements may have linear dependence on relative dip angle when the electromagnetic (EM) tool is not crossing the bed boundary. As such, FIGS. 9 and 10 may be used to illustrate the insensitivity of symmetrized directional measurements to relative dip angle once the electromagnetic (EM) tool is not crossing the boundary and the insensitivity of anti-symmetrized directional measurements to nearby shoulder-beds.

Various technologies described herein may be implemented in program instructions, which may be stored in a computer readable medium, such as any memory associated with a surface system, a bottom hole assembly, a processor, and/or a downhole communications system. Such program instructions may be executed by a computer processor. The program instructions may be written in a computer programming language, such as C++, Java, Fortran and the like. The program instructions may be "object code," i.e., in binary form that is substantially executable directly by the computer, in "source code" that requires compilation or interpretation before execution; or in some intermediate form such as partially compiled code.

The computer-readable medium storing the program instructions may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by a processor. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method to determine a parameter of a subsurface formation traversed by a borehole, comprising:
    making at least two cross dipole measurements;
    forming an anti-symmetrized combination from the at least two cross dipole measurements, wherein the anti-symmetrized combination has enhanced sensitivity to anisotropy and relative dip angle of the subsurface formation; and
    wherein the forming comprises adding the cross dipole measurements to produce an anti-symmetrized combination.

2. The method of claim 1, wherein the at least two cross dipole measurements comprise XZ and ZX voltage measurements.

3. The method of claim 1, wherein the cross dipole measurements are made with antennas in which at least one of the antennas has a tilted dipole moment relative to a tool axis.

4. A method for determining a parameter of a subsurface formation traversed by a borehole, comprising:
(a) disposing a logging tool comprising:
a first pair of transmitter-receiver antennas with a first antenna having a dipole moment tilted at an angle $\theta_1$ with respect to a longitudinal axis of the logging tool and a second antenna having a dipole moment tilted at an angle $\theta_2$ with respect to the longitudinal axis of the logging tool;
a second pair of transmitter-receiver antennas with a first antenna, disposed near the second antenna of the first pair, having a dipole moment tilted at the angle $\theta_1$ with respect to the longitudinal axis of the logging tool and a second antenna, disposed near the first antenna of the first pair, having a dipole moment tilted at the angle $\theta_2$ with respect to the longitudinal axis of the logging tool;
(b) measuring a first signal at one of the antennas in the first transmitter-receiver pair transmitted by the other antenna of the first transmitter-receiver pair;
(c) measuring a second signal at one of the antennas in the second transmitter-receiver pair transmitted by the other antenna of the second transmitter-receiver pair; and
(d) adding the measured signals of steps (b) and (c) to determine the parameter of the subsurface formation, wherein the combination of the measured signals has enhanced sensitivity to anisotropy and relative dip angle of the subsurface formation.

5. The method of claim 4, wherein the angle $\theta_1$ and the angle $\theta_2$ are different.

6. The method of claim 4, wherein the angle $\theta_1$ and the angle $\theta_2$ are the same.

7. The method of claim 4, wherein the angle $\theta_1$ and the angle $\theta_2$ are different from 90 degrees.

8. The method of claim 4, wherein the logging tool is an induction tool, a propagation tool, or a dielectric constant tool.

9. A method for determining a parameter of a subsurface formation traversed by a borehole, comprising:
(a) disposing a logging tool inside a formation layer having an upper boundary and a lower boundary, wherein the logging tool comprises
a first pair of transmitter-receiver antennas with a first antenna having a first dipole moment tilted at an angle $\theta_1$ with respect to a longitudinal axis of the logging tool and a second antenna having a second dipole moment tilted at an angle $\theta_2$ with respect to the longitudinal axis of logging tool, and
a second pair of transmitter-receiver antennas with a first antenna, disposed near the second antenna of the first pair, having a first dipole moment tilted at the angle $\theta_1$ with respect to the longitudinal axis of the logging tool, and a second antenna, disposed near the first antenna of the first pair, having a second dipole moment tilted at the angle $\theta_2$ with respect to the longitudinal axis of the logging tool;
(b) measuring a first signal at one of the first or second antennas of the first transmitter-receiver pair transmitted by the other of the first and second antennas of the first transmitter-receiver pair while at least one component of the first or second dipole moments is substantially directed toward the upper boundary;
(c) rotating the logging tool by substantially 180 degrees about its longitudinal axis;
(d) measuring a second signal by repeating step (b) while the dipole moment component identified in step (b) is directed toward the lower boundary as a result of the 180 degree rotation;
(e) calculating a logarithmic function of the ratio between the measured first and second signals;
(f) repeating steps (b) through (d) using the second transmitter-receiver pair;
(g) calculating a logarithmic function of the ratio between the measured first and second signals from the second transmitter-receiver pair; and
(h) adding the logarithmic function of step (e) and the logarithmic function of step (g) to determine the parameter of the subsurface formation, wherein the combination of the logarithmic functions has enhanced sensitivity to anisotropy and relative dip angle of the subsurface formation.

10. The method of claim 9, wherein the logging tool is a propagation tool.

11. A method for determining a parameter of a subsurface formation traversed by a borehole, comprising:
(a) disposing a logging tool inside a formation layer having an upper boundary and a lower boundary, wherein the logging tool comprises a pair of transmitter-receiver antennas with a first antenna having a first dipole moment tilted at an angle $\theta$ with respect to a longitudinal axis of the logging tool and a second antenna having a second dipole moment at substantially the same angle $\theta$ with respect to the longitudinal axis of the logging tool;
(b) measuring a first signal at one of the first or second antennas of the transmitter- receiver pair transmitted by the other of the first and second antennas of the transmitter-receiver pair while at least one component of the first or second dipole moments is substantially directed toward the upper boundary;
(c) rotating the logging tool by substantially 180 degrees about its longitudinal axis;
(d) measuring a second signal by repeating step (b) while the dipole moment component identified in step (b) is directed toward the lower boundary as a result of the 180 degree rotation; and
(e) adding a logarithmic function of the ratio between the measured first and second signals, wherein the logarithmic function has enhanced sensitivity to anisotropy and relative dip angle of the subsurface formation.

12. The method of claim 11, wherein the angle $\theta$ is less than 90 degrees.

13. A method for determining a parameter of a subsurface formation traversed by a borehole, comprising:
(a) disposing a logging tool comprising:
a first pair of transmitter-receiver antennas with a first antenna having a dipole moment tilted at an angle $\theta_1$ with respect to a longitudinal axis of the logging tool and wherein $\theta_1$ is between 90 and 180 degrees and a second antenna having a dipole moment tilted at an angle $\theta_2$ with respect to the longitudinal axis of the logging tool and wherein $\theta_2$ is between 0 and 90 degrees;
a second pair of transmitter-receiver antennas with a first antenna, disposed near the second antenna of the first pair, having a dipole moment tilted at an angle $\theta_1$ with respect to the longitudinal axis of the logging tool and wherein $\theta_1$ is between 90 and 180 degrees, and a second antenna, disposed near the first antenna of the first pair, having a dipole moment tilted at the angle $\theta_2$ with respect to the longitudinal axis of the logging tool and wherein $\theta_2$ is between 0 and 90 degrees;

(b) measuring a first signal at one of the antennas in the first transmitter-receiver pair transmitted by the other antenna of the first transmitter-receiver pair;

(c) measuring a second signal at one of the antennas in the second transmitter-receiver pair transmitted by the other antenna of the second transmitter-receiver pair; and (d) adding the measured signals of steps (b) and (c) to determine the parameter of the subsurface formation, wherein the combination of measured signals has enhanced sensitivity to anisotropy and relative dip angle of the subsurface formation.

* * * * *